May 2, 1961 H. C. DILLON 2,982,293
PRESSURE SIGNAL AMPLIFIER
Filed July 9, 1959
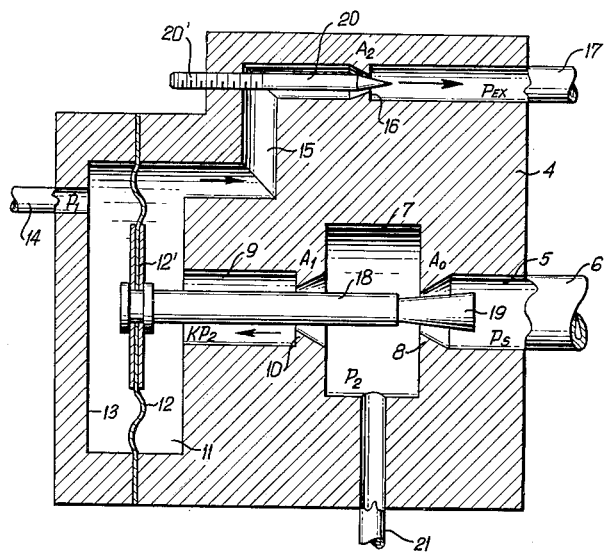
INVENTOR.
HOWARD C. DILLON
BY
R.E. Geangue
ATTORNEY.

United States Patent Office 2,982,293
Patented May 2, 1961

2,982,293

PRESSURE SIGNAL AMPLIFIER

Howard C. Dillon, Granada Hills, Calif., assignor to The Marquardt Corporation, Van Nuys, Calif., a corporation of California Filed July 9, 1959, Ser. No. 825,957

5 Claims. (Cl. 137—82)

This invention relates to a pressure signal amplifier and more particularly to a signal amplifier of simplified and reliable construction.

In present type control systems for engines, processing plants and the like, pressures are utilized as control parameters and it often occurs that the magnitude of a pressure signal must be amplified before it can be used in the control system or for actuation of control mechanisms. The present invention provides a pressure signal amplifier which eliminates the use of multiple diaphrams and bellows found in prior amplifiers of this type. Basically, the present invention comprises a source of pressure which is introduced to a passage containing three orifices or restrictions in series. A single diaphragm is responsive on one side to the pressure between the last two orifices and is responsive in the other side to the input pressure signal. The movement of the diaphragm positions a valve to adjust the area of the first orifice and the amplified pressure signal is obtained between the first two orifices. When the pressure source comprises a compressible fluid at a high enough pressure, all of the orifices will be choked since sonic velocity flow will be present at the orifice throats. Under such conditions, the three orifices in series provide two separate pressure divider devices, such as disclosed in United States Patent Re. 24,410 granted to John A. Drake. Also, the present invention can be utilized with an incompressible fluid which continually flows through the spaced orifices since a pressure drop will be present across each orifice.

It is therefore an object of the present invention to provide a simple and reliable pressure signal amplifier.

Another object of the present invention is to provide a pressure signal amplifier having a passage connected with a pressure source and containing three orifices in series, the pressure between two of the orifices being compared with the input pressure signal to provide an amplified output pressure signal between two other of the orifices.

These and other objects of the invention not specifically set forth will become readily apparent from the description and drawing which is a diagrammatic illustration of the subject invention.

Referring to the drawing, the casing 4 contains a passage 5 which is connected to a supply pressure source $P_s$ (not shown) by a conduit 6. The passage 5 connects with a chamber 7 through an orifice 8 and the chamber discharges into a passage 9 through an orifice 10. The passage 9 connects with space 11 at one side of diaphragm 12 and space 13 at the other side of the diaphragm is connected by passage 14 to an input pressure signal $P_1$ which can be obtained from any desired source. The space 11 discharges to a low exhaust pressure $P_{ex}$, such as atmospheric pressure, through passage 15, orifice 16 and an exhaust passage 17.

A rod 18 of uniform diameter is secured at one end to the rigid portion 12' of diaphragm 12 and extends through orifice 10. The end 19 of rod 18 is tapered to form a valve head for varying the orifice area $A_0$ of orifice 8 upon movement of rod 18. Since the rod 18 is of uniform diameter, the area $A_1$ of orifice 10 will remain constant during movement of the rod. The area $A_2$ of orifice 16 is adjustable by a needle 20 having end 20' threaded into casing 4. The amplified pressure signal $P_2$ is sensed at chamber 7 through a passage 21 leading to the point of use of the amplified pressure signal.

The operation of the signal amplifier will now be described. A source pressure $P_s$ of a compressible fluid can be connected with casing 4 and the pressure can be sufficient to choke each of the orifices 8, 10 and 16 so that these orifices provide two pressure divider devices. The first pressure divider device comprises the orifices 8 and 10 and the chamber 7 therebetween and the pressure $P_2$ in chamber 7 will be some fraction of the supply pressure $P_s$ determined by the area ratio $A_0/A_1$. The second pressure divider device comprises the orifices 10 and 16 and the space 11 intermediate the orifices. Since the areas $A_1$ and $A_2$ of the orifices 10 and 16, respectively, are fixed, the space 12 always contains a fraction K of the pressure $P_2$ in the space 7, and the fraction K will be determined by the area ratio $A_1/A_2$.

When an input pressure signal $P_1$ is introduced to space 13 from passage 14, the diaphragm 12 will move the valve head 19 in a direction to vary the area $A_0$ of orifice 8 to obtain a pressure $P_2$ in space 7, the fraction $KP_2$ of which will just balance the introduced pressure signal $P_1$. Upon any change in the introduced pressure signal, the position of valve head 19 will change to maintain a pressure balance on the diaphragm 12. Thus, the forced balance on the diaphragm 12 can be stated as follows:

$$P_1 = KP_2 \text{ or } P_2 = \frac{1}{K}P_1$$

It is therefore apparent that the amplified pressure $P_2$ is always directly proportional to the input pressure $P_1$ and is greater than the pressure $P_1$ by the reciprocal of the proportionality factor K. Since the factor K is equal to $A_1/A_2$, the area of the orifices 10 and 16 can be varied to determine the amplification ratio of the amplifier.

The device of the present invention is essentially insensitive to the level of the supply pressure $P_s$ since the position of the valve head 19 will be such that the pressure $P_2$ derived from any pressure source will be the desired amplified signal. Also, should the input pressure $P_1$ be equal to or less than the exhaust pressure $P_{ex}$, an exhauster can be attached to the passage 17 to maintain the pressure divider action of the orifices. While the operation has been described for conditions under which the orifices are choked, it is apparent that similar operation will result when the orifices are unchoked or when an incompressible fluid source $P_s$ is utilized since a pressure drop will result across each of the orifices 8, 10 and 16. It is understood that various orifices and passage arrangements, in addition to the illustrated arrangement, can be utilized. Various other modifications are contemplated by those skilled in the art without departing from the spirit and scope of the invention as hereinafter defined by the appended claims.

What is claimed is:

1. A pressure signal amplifier comprising passage means containing three orifices in series, means for introducing to said passage means a fluid at a source pressure, pressure differential means responsive on one side to the pressure existing between the second and third orifices, means for connecting an input signal pressure to the other side of said differential means, valve means movable by said pressure differential means for regulating the area of the first orifice, and means for sensing the pressure between the first and second orifices to obtain an output pressure which is a multiple of the input pressure.

2. A pressure signal amplifier as defined in claim 1 having a needle valve for adjusting the throat area of said third orifice to thereby vary the ratio between the input and output pressures.

3. A pressure amplifier comprising a diaphragm having first and second spaces on opposite sides thereof, first passage means for introducing an input pressure signal $P_1$ to one of said spaces, second passage means connected between a source pressure $P_s$ and the other of said spaces, said second passage means containing first and second orifices spaced apart, third passage means connecting said other space to exhaust pressure $P_{ex}$ and containing a third orifice, valve means connected with said diaphragm for varying the area of said first orifice to produce an amplified pressure $P_2$ intermediate said first and second orifices and a balancing pressure $KP_2$ in said first space intermediate said second and third orifices, and means connected with the space intermediate said first and second orifices to sense the amplified pressure $P_2$ having a value proportional to the input pressure signal $P_1$.

4. A pneumatic signal amplifier comprising a passage containing three orifices in series along the passage, means for introducing a compressible fluid to the first of said orifices at a source pressure $P_s$ sufficient to choke all the orifices, pressure differential means responsive on one side to the pressure existing between said second and third orifices, means for connecting the other side of said differential means to the input pressure to be amplified, valve means connected with said pressure differential means for varying the area of said first orifice until the pressures on opposite sides of said pressure differential means are in balance, and means connected to said passage intermediate said first and second orifices for obtaining an amplified output pressure proportional to the input pressure.

5. A pneumatic signal amplifier as defined in claim 4 having a needle valve for adjusting the throat area of said third orifice to thereby vary the ratio between the input and output pressures.

References Cited in the file of this patent

UNITED STATES PATENTS 2,718,232     Cook et al. _____ Sept. 20, 1955